Nov. 23, 1926.
J. POSPIECH
1,608,182
INSERTABLE SAW TOOTH FOR CIRCULAR SAW BLADES
Filed April 20, 1926
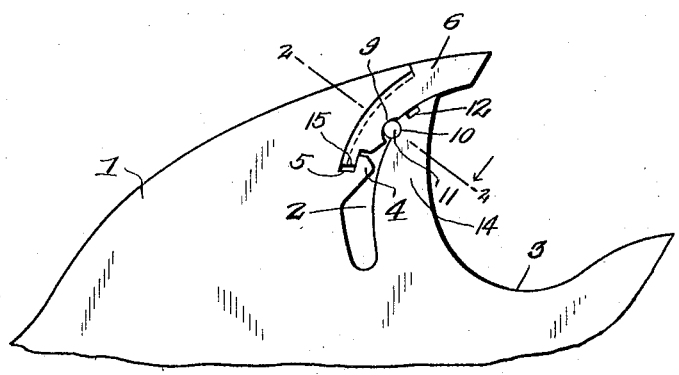
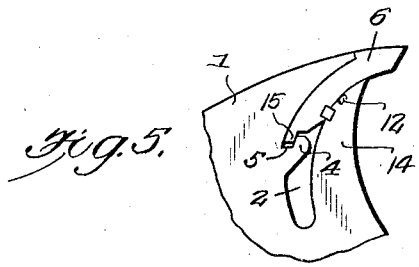
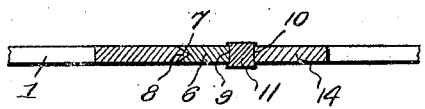
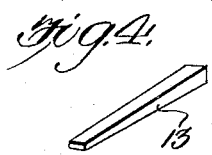
Inventor
Josef Pospiech,
By Clarence A. O'Brien
Attorney Patented Nov. 23, 1926.

1,608,182

UNITED STATES PATENT OFFICE.

JOSEF POSPIECH, OF MOSSIDE, ALBERTA, CANADA.

INSERTABLE SAW TOOTH FOR CIRCULAR-SAW BLADES.

Application filed April 20, 1926. Serial No. 103,303.

The present invention relates to improvements in circular saw blades and has reference more particularly to one wherein an insertable saw tooth is adapted to be associated therewith.

One of the important objects of the present invention is to provide a circular saw blade which is provided with a socket for receiving the saw tooth, means being provided for locking the tooth in position in the socket against accidental displacement therefrom.

Another important object of the invention is to provide a structure of the above mentioned character which will not add to the circumferential strain of the saw blade when the latter is rotated, at a relatively great speed.

A further object is to provide an insertable saw tooth for a circular saw blade which may be readily and easily inserted or removed without the loss of any considerable length of time or labor.

Another important object of the invention is to provide a circular saw blade and an insertable tooth therefor which is simple in construction, inexpensive, strong and durable, and further well adapted to the purpose for which it is designed.

Other objects and advantages of the invention will become apparent during the course of the following description taken in connection with the accompanying drawing.

In the accompanying drawing forming a part of this application and in which like numerals designate like parts throughout the several views:

Figure 1 is a fragmentary side elevation of a circular saw blade showing my improved saw tooth secured in the socket provided therefor in the blade.

Figure 2 is a sectional view taken approximately on line 2—2 of Figure 1 looking in the direction of the arrows.

Figure 3 is an enlarged detail of the locking member for the tooth, the curvature of its outline being exaggerated for the purpose of illustration.

Figure 4 is a detail perspective view of the wedge forming a part of the present invention, and Figure 5 is a view similar to Figure 1 showing the modification of the tooth securing means.

In the drawing wherein for the purpose of illustration is shown the preferred embodiment of my invention, the numeral 1 designates the circular saw blade, the same being provided with a partially arcuate shaped and a partially straight cut out portion or socket 2 which extends inwardly from the edge of the blade at a point adjacent saw dust gullet 3, thereby forming a prong 14. A shoulder 4 extends into the socket or cut out portion 2 from the concaved side wall of the socket at the intermediate portion thereof and this shoulder 4 is provided with the notched or cut out portion 5 in the manner as is clearly shown in Figure 1 of the drawing.

The insertable saw tooth forming a part of the present invention is designated generally by the numeral 6 and is substantially arcuate in design to conform to the shape of the socket formed in the circular blade 1. The convex edge of the insertable saw tooth 6 is provided with the substantially V-shaped groove 7, the same being adapted for cooperation with the substantially V-shaped edge 8 formed in the concaved wall of the socket 2. This construction is clearly shown in Figure 2 of the drawing.

A lip or tongue 15 is formed on the lower end of the convex side of the insertable saw tooth 6 and is adapted to be received within the notched or cut out portion 5 provided therefor in the inwardly extending shoulder 4. In this manner, the inner end of the insertable saw tooth is maintained in proper position within the intermediate portion of the socket formed in the circular saw blade 1.

The coacting V-shaped portions 7 and 8 of the saw blade 1 and the socket 2 respectively provide a means whereby the saw tooth may be guided during the sliding movement when inserting or removing the tooth with respect to the socket.

For the purpose of locking the insertable saw tooth 6 in position within the socket 2, the concave edge of the lower or inner portion of the tooth 6 and the adjacent or convex edge of the prong 14 have formed therein, the complementary notches 9 and 10 respectively. The locking means per se comprises a relatively short pin 11, which is of a length slightly greater than the width of the saw blade 1 and the tooth 6. It is of course to be understood that the tooth is of substantially the same thickness as the saw blade. The construction of the locking pin is clearly shown in Figures 2 and 3 of the drawing, and it will be noted that the pin is compressed in the intermediate portion or middle thereof so that the same gradually increases in diameter from its center toward its outer end. By constructing a locking pin in the manner shown and above described, it will be impossible for the pin to become accidentally disengaged from the complementary notches 9 and 10 which are reamed to conform to the outline of the locking pin 11 when properly positioned between the concave edge of the tooth 6 and the convex edge of the prong 14.

The manner in which the locking pin is inserted or removed will now be described. A substantially rectangular shaped opening 12 is formed in the convex edge of the prong 14 adjacent the outer end thereof and a similar shaped wedge 13 such as is shown in Figure 4 is adapted to be driven into the opening 12 so that the opposite sides of the wedge will engage the convex wall of the socket 2 and the concaved edge of the tooth 6 after the tooth has been inserted within the socket so as to cause a slight spreading action to take place between the prong 14 and the insertable tooth 6.

The spreading action is sufficient to permit the locking pin 11 to be inserted between the complementary notches 9 and 10 formed in the concave edge of the tooth 6 and the convexed wall of the socket 2 respectively. When the wedge 13 is removed from between the concave edge of the tooth 6 and the convex wall of the socket 2, the resiliency of the prong as well as the tooth will cause the elements to swing back to their normal positions so that the pin 11 will be held in locked engagement with the complementary notches 9 and 10, thus securing the tooth against accidental displacement from the socket in the saw blade.

While I have shown a substantially circular shaped pin as the preferred form of the locking device, it is to be understood that locking pins of other shapes may be substituted, and as is illustrated in Figure 5, the locking pin shown therein is substantially rectangular in design. It is to be understood that the intermediate portion of the locking pin is reduced so that the locking pin cannot become dislodged from the complementary notches 9 and 10.

Also if desired, a screw threaded locking pin may be employed, it being understood of course that the complementary notches 9 and 10 will also be threaded to cooperate with the threads of such a locking pin.

It will thus be seen from the foregoing description, that I have provided a novel yet simple means for locking an insertable saw tooth in a circular saw blade, and the simplicity in which the parts are arranged enables the same to be readily and easily accessible for inserting or removing the tooth from the blade.

While I have shown the preferred embodiment of my invention, it is to be understood that minor changes in the size, shape, and arrangement of parts may be resorted to without departing from the spirit of the invention and the scope of the appended claims.

Having thus described the invention, what I claim as new and desire to secure by Letters Patent is:—

1. The combination with a circular saw blade provided with a socket which extends inwardly from the edge of the blade at a point adjacent the usual saw dust gullet whereby a prong is formed, a shoulder extending into the socket from one side thereof, said shoulder having a notch formed in the upper portion thereof, of a saw tooth slidably fitted in the socket, a tongue formed in the inner end of the tooth and adapted to fit in said notch, and means for securing the tooth against accidental displacement from the socket.

2. The combination with a circular saw blade provided with a socket which extends inwardly from the edge of the blade at a point adjacent the usual saw dust gullet whereby a prong is formed, a shoulder extending into the socket from one side thereof, said shoulder having a notch formed in the upper portion thereof, of a saw tooth slidably fitted in the socket, a tongue formed in the inner end of the tooth and adapted to fit in said notch, means for securing the tooth against accidental displacement from the socket, said means comprising a locking pin disposed transversely between the adjacent side edges of the tooth and said prong.

In testimony whereof I affix my signature.

JOSEF POSPIECH.